United States Patent
Ito et al.

(10) Patent No.: US 6,751,070 B2
(45) Date of Patent: Jun. 15, 2004

(54) THIN FILM MAGNETIC HEAD AND METHOD FOR FABRICATING THE SAME

(75) Inventors: Noriyuki Ito, Chuo-ku (JP); Kosuke Tanaka, Chuo-ku (JP); Koichi Terunuma, Chuo-ku (JP)

(73) Assignee: TDK Corporation, Tokyo (JP)

( * ) Notice: Subject to any disclaimer, the term of this patent is extended or adjusted under 35 U.S.C. 154(b) by 78 days.

(21) Appl. No.: 10/153,689

(22) Filed: May 24, 2002

(65) Prior Publication Data

US 2003/0081358 A1 May 1, 2003

(30) Foreign Application Priority Data

Nov. 1, 2001 (JP) ........................................ 2001-336375

(51) Int. Cl.[7] .............................................. G11B 5/39
(52) U.S. Cl. .................................. 360/317; 360/324.12
(58) Field of Search ............................ 360/317, 324.12, 360/322

(56) References Cited

U.S. PATENT DOCUMENTS

| | | | |
|---|---|---|---|
| 5,438,470 A | 8/1995 | Ravipati et al. | |
| 6,141,190 A | 10/2000 | Nakamoto et al. | |
| 6,344,953 B1 * | 2/2002 | Kautzky et al. | 360/322 |
| 6,570,745 B1 * | 5/2003 | Gill | 360/324.12 |
| 2002/0051328 A1 * | 5/2002 | Hasegawa | 360/322 |
| 2002/0135953 A1 * | 9/2002 | Gill | 360/324.12 |
| 2002/0154457 A1 * | 10/2002 | Horng et al. | 360/324.12 |

FOREIGN PATENT DOCUMENTS

| JP | A 2000-207713 | 7/2000 | |
|---|---|---|---|
| JP | 2000285414 A * | 10/2000 | G11B/5/39 |

* cited by examiner

*Primary Examiner*—William Klimowicz
(74) *Attorney, Agent, or Firm*—Oliff & Berridge, PLC

(57) ABSTRACT

A first and a second longitudinal bias-applying films are formed via a first mask at both sides of a magnetoresistive effective element film so that the difference in surface level between the magnetoresistive effective element film and the first and the second longitudinal bias-applying films is set within ±20 nm. Then, a first and a second electrode films are formed so as to cover edge portions of the magnetoresistive effective element film and the first and the second longitudinal bias-applying films.

4 Claims, 6 Drawing Sheets

THIN FILM MAGNETIC HEAD AND METHOD FOR FABRICATING THE SAME

BACKGROUND OF THE INVENTION

1. Field of the Invention

This invention relates to a thin film magnetic head, particularly to a magnetoresistive effective type thin film magnetic head and a method for fabricating the same.

2. Related Art Statement

As a magnetic conversion device employed in a hard disk driving device, a combination type thin film magnetic head, where an inductive type thin film magnetic head element for writing and a magnetoresistive effective type thin film magnetic head element are stacked on a given substrate in turn, is widely available. With the development of the surface recording density of such a hard disk driving device, the performance of such a combination type thin film magnetic head is required to be developed. As a magnetoresistive effective type thin film magnetic head element, an AMR element utilizing normal anisotropic magnetoresistive effect is usually employed, but recently, a GMR element utilizing giant magnetoresistive effect several times as large as the normal anisotropic magnetoresistive effect is developed and widely available.

In the AMR element, surface recording density of several giga bits/inch$^2$ can be realized, and in the GMR element, the surface recording density can be more enhanced. As a result, a large capacity hard disk driving device having a capacity of several ten giga bits or over can be realized.

As of now, various types of GMR element are proposed, but particularly attention is paid to a spin-valve GMR element. In the spin-valve GMR element, longitudinal bias-applying films are formed in both sides of a magnetoresistive effective film (MR film). In some cases, both edges of the MR film are covered with electrode films. In this case, the distance between the electrode films is set smaller than the distance between the longitudinal bias-applying films. Such an element structure is usually called as a "lead overlay structure", and is disclosed in Japanese Patent Applications Laid-open Hei 8-45037 (JP A 8-45037) and Hei 9-282618 (JP A 9-282618). Such a lead overlay structure is employed in an AMR element as well as the spin-valve GMR element. In a magnetoresistive effective type thin film magnetic head having such a lead overlay structure, Barkhausen noise can be repressed effectively and fluctuation in output power can be reduced. Therefore, the sensitivity of the thin film magnetic head can be enhanced.

In fabricating the magnetoresistive effective type thin film magnetic head having the lead overlay structure, two uniform films are formed and patterned to form the longitudinal bias-applying films and the electrode films, respectively. In this case, that is, two photolithography steps are required. Normally, the longitudinal bias-applying films are formed and thereafter, the electrode films are formed. As mentioned above, since the distance between the electrode films is set smaller than the distance between the longitudinal bias-applying films, the above photolithography steps are difficult and thus, the longitudinal bias-applying films and the electrode films can not be patterned precisely.

Particularly, in forming the electrode films, the surface level of the MR film is different from the surface level of the longitudinal bias-applying films. Therefore, it is more difficult to form the electrode films precisely due to the steps created between the MR film and the longitudinal bias-applying films, so that the magnetoresistive effective type thin film magnetic head can not be fabricated stably on a wafer as a substrate.

SUMMARY OF THE INVENTION

It is an object of the present invention to mitigate the defect in the above conventional fabricating method and thus, to provide a thin film magnetic head including a magnetoresistive effective type thin film magnetic head element of stable output power level.

It is another object of the present invention to provide a method for fabricating stably a thin film magnetic head including a magnetoresistive effective type thin film magnetic head element of a desired output power level.

For achieving the above objects, this invention relates to a thin film magnetic head including a magnetoresistive effective type thin film magnetic head element comprising:

a first and a second magnetic shielding films which are made of magnetic material, a first and a second shielding gap films which are made of non-magnetic insulating material and located between the first and the second magnetic shielding films, a magnetoresistive effective element film which is located between the first and the second shielding gap films, a first and a second longitudinal bias-applying films which are located in both sides of the magnetoresistive effective element film, and a first and a second electrode films which are located so as to cover edge portions of the magnetoresistive effective element film beyond the first and the second longitudinal bias-applying films, wherein the difference in surface level between the magnetoresistive effective element film and the first and second longitudinal bias-applying films is set within ±20 nm.

Also, this invention relates to a method for fabricating a thin film magnetic head including a magnetoresistive effective type thin film magnetic head element comprising a first and a second magnetic shielding films which are made of magnetic material, a first and a second shielding gap films which are made of non-magnetic insulating material and located between the first and the second magnetic shielding films, a magnetoresistive effective element film which is located between the first and the second shielding gap films, a first and a second longitudinal bias-applying films which are located in both sides of the magnetoresistive effective element film, and a first and a second electrode films which are located so as to cover edge portions of the magnetoresistive effective element film beyond the first and the second longitudinal bias-applying films, comprising the steps of:

forming the first shielding film on a given substrate, forming the first shielding gap film on the first shielding film, forming a magnetoresistive effective film on the first shielding gap film, partially etching and removing the magnetoresistive effective film via a first mask fabricated thereon to pattern and form the magnetoresistive effective element film, forming the first and the second longitudinal bias-applying films via the first mask at both sides of the magnetoresistive effective element film so that the difference in surface level between the magnetoresistive effective element film and the first and the second longitudinal bias-applying films is set within ±20 nm, forming the first and the second electrode films so as to cover edge portions of the magnetoresistive effective element film and the first and the second longitudinal bias-applying films, forming the second shielding gas film so as to cover the magnetoresistive effective element film, the first and the second electrode films, and forming the second shielding film on the second shielding gap film.

The inventors confirmed on many researches that if the difference in surface level between the MR film and the first and second longitudinal bias-applying films is set within ±20 nm, the first and second electrode films can be patterned and formed on a wafer as a substrate as designed. Therefore, many thin film magnetic heads can be fabricated on the same wafer as designed in dimension. As a result, since the distance between the first and the second electrode films can be defined precisely in each thin film magnetic head, the track width can be formed minutely and precisely as designed because it is defined by the distance between the first and the second electrode films.

The first and the second longitudinal bias-applying films are composed of hard magnetic films, underfilms for controlling the orientations of the hard magnetic films and protective films to protect the hard magnetic films, respectively. The thickness of the hard magnetic film is determined on the design specification of the thin film magnetic head, so can not be changed. For setting within ±20 nm the difference in surface level between the MR film and the first and second longitudinal bias-applying films, therefore, the thickness of the underfilm and/or the protective film may be controlled. Moreover, in the etching step for forming the MR film, the etching depth of the first shielding gap film which is located under the MR film may be controlled. These controlling means may be combined appropriately.

In the thin film magnetic head of the present invention, since the first and the second electrode films can be patterned and formed precisely, the track width defined by the distance between the first and the second electrode films can be narrowed. In a preferred embodiment of the present invention, the track width can be reduced up to 0.2 μm or below.

The thin film magnetic head may be preferably fabricated as a combination type thin film magnetic head where on a given substrate, are stacked a magnetoresistive effective type thin film magnetic head element for reading according to the present invention and an inductive type thin film magnetic head element for writing. The stacking order is not restricted. Normally, the inductive type thin film magnetic head element may be stacked on the magnetoresistive effective type thin film magnetic head element fabricated on the substrate (normal type). Reversely, the magnetoresistive effective type thin film magnetic head element may be stacked on the inductive type thin film magnetic head fabricated on the substrate (reversed type).

BRIEF DESCRIPTION OF THE DRAWINGS

For a better understanding of this invention, reference is made to the attached drawings, wherein.

DETAILED DESCRIPTION OF PREFERRED EMBODIMENTS

Figure 1:
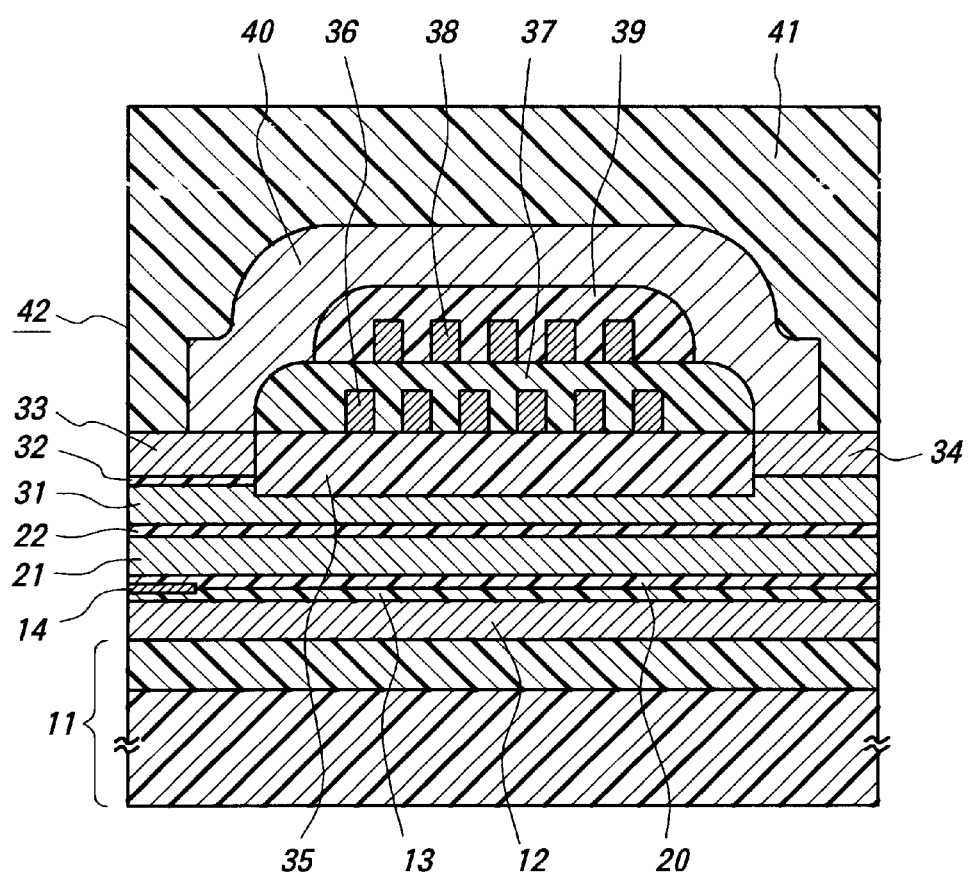
FIG. 1 is a cross sectional view showing a thin film magnetic head according to the present invention, taken on a surface perpendicular to the air bearing surface thereof.
Figure 2:
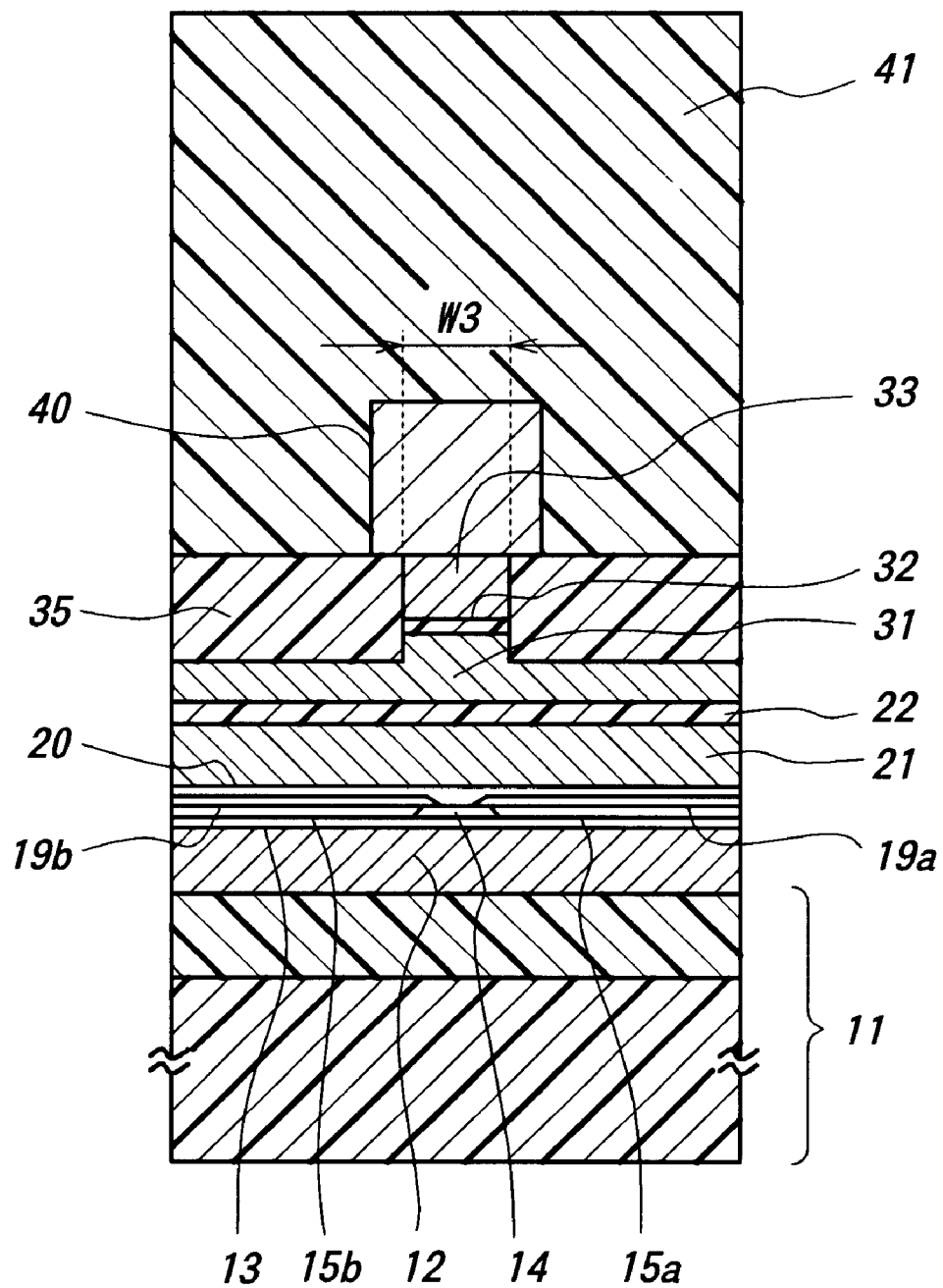
FIG. 2 is a cross sectional view showing the thin film magnetic head illustrated in FIG. 1, taken on a surface parallel to the air bearing surface and across the magnetic pole portion.
Figure 3:
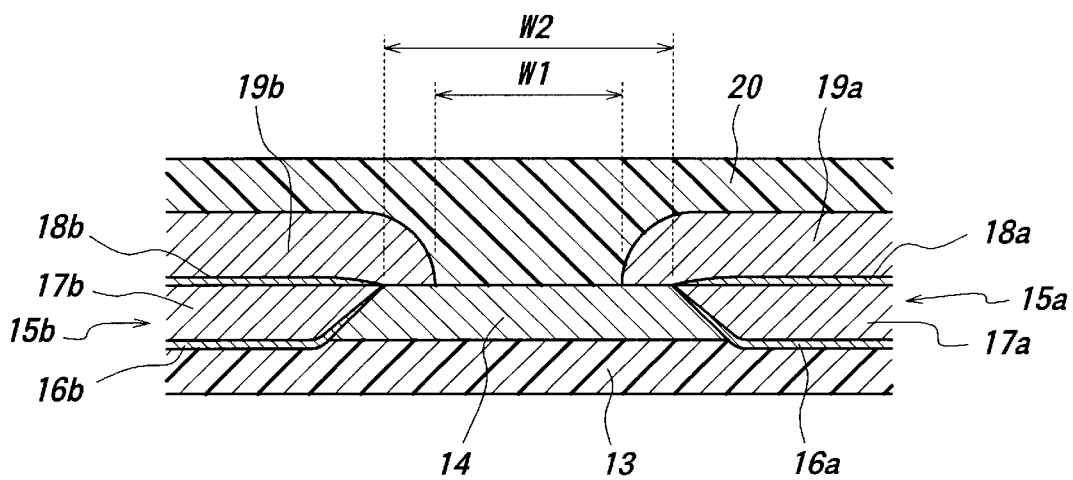
FIG. 3 is a cross sectional view showing in detail the magnetoresistive effective type thin film magnetic head element of the thin film magnetic head illustrated in FIGS. 1 and 2.

This invention will be described in detail, with reference to the drawings, hereinafter. FIGS. 1–3 are cross sectional views showing a thin film magnetic head according to the present invention. FIG. 1 is a cross sectional view of the thin film magnetic head, taken on a surface perpendicular to the air bearing surface thereof. FIG. 2 is a cross sectional view of the thin film magnetic head illustrated in FIG. 1, taken on a surface parallel to the air bearing surface and across the magnetic pole portion. FIG. 3 is an enlarged cross sectional view showing the magnetoresistive effective type thin film magnetic head element of the thin film magnetic head illustrated in FIGS. 1 and 2. In this embodiment, a normal combination type thin film magnetic head will be described in detail hereinafter, where a magnetoresistive effective type thin film magnetic head element (MR element) for writing and an inductive type thin film magnetic head element are stacked on a given substrate in turn.

The MR element and the inductive type thin film magnetic head element are stacked on one main surface of a substrate 11 made of AlTiC via an insulating film made of alumina. The MR element includes a bottom shielding film 12 formed on the substrate 11, a bottom shielding gap film 13 made of a given insulating material and formed on the bottom shielding film 12, and a magnetoresistive effective element film (MR film) 14 exhibiting magnetoresistive effect formed on the bottom shielding gap film 13.

In both sides of the MR film 14 are formed a first and a second longitudinal bias-applying films 15a and 15b to reduce Barkhausen noise by applying a given longitudinal bias voltage. The longitudinal bias-applying films 15a and 15b include underfilms 16a and 16b, hard magnetic films 17a and 17b, and protective films 18a and 18b, respectively. On the longitudinal bias-applying films 15a and 15b are formed a first and a second electrode films 19a and 19b so as to be contacted with the edges of the top surface of MR element 14. Therefore, the distance W1 between the electrode films 19a and 19b is set smaller than the distance W2 between the longitudinal bias-applying films 15a and 15b. As a result, the MR element has a lead overlay structure. A top shielding gap film 20 is formed of an insulating material on the MR film 14 and the electrode films 19a and 19b, and a top shielding film 21 is formed of a magnetic material on the top shielding gap film 20.

Also, a separating film 22 to magnetically separate the MR element and the inductive type thin film magnetic head element is formed on the top shielding film 21. Therefore, the inductive type thin film magnetic head element is located on the separating film 22. Then, the inductive type thin film magnetic head element includes a bottom pole portion 31 formed on the separating film 22, a writing gap film 32 made of an non-magnetic material such as alumina and formed on the bottom pole portion 31, and a pole chip 33 made of a magnetic material having a large saturated magnetic flux density such as permalloy (FeNi), iron nitride (FeN) or cobalt iron (FeCo) and formed on the writing gap film 32. The recording track width is defined by the width W3 of the pole chip 33, so that for realizing large surface recording density, the width W3 is reduced up to the order of submicron. At the formation of the pole chip 33, a bridging member 34 is also formed.

For preventing the broadening of the effective writing track width, that is, preventing the broadening of the magnetic flux from the bottom pole 31 and/or the pole chip 33, a portion of the writing gap film 32 around the pole chip 33 is etched and removed by means of ion-milling and/or reactive ion etching utilizing the writing gap film 32 itself as a mask. At the same time, the bottom pole portion 31 is partially removed in the thickness direction to form a trim-shaped pole portion. Thereafter, an insulating film 35 made of alumina is formed and flattened by means of CMP so that the surface level of the insulating film 35 is almost equal to the surface level of the pole chip 33.

Then, a first coil film 36 is made of e.g., Cu on the flattened insulating film 35. Each portion of the first coil film 36 is separated from one another by an insulating film 37. The insulating film 37 is flattened, and a second coil film 38 is made on the flattened insulating film 37. Each portion of the second coil film 38 is also separated from one another by an insulating film 39.

Then, the thus obtained multilayered assembly is fired at 250° C. so that the insulating film 39 is flattened, and a top pole portion 40 is made of permalloy on the pole chip 33 and the insulating films 37 and 39. Then, the thus obtained multilayered assembly is covered entirely with an overcoating film 41.

At last, the side surface of the multilayered structure is polished to form an air bearing surface (ABS) 42 to be opposite to a magnetic recording medium. At the formation of the ABS 42, the MR film 14 is also polished, and the Throat Height (TH) and MR Height (MRH) are defined. Although in a real thin film magnetic head, pads for electric connection of the coil films 36; 38 and the electrode films 19a; 19b are provided, in this embodiment, they are omitted for simplification. The forefront of the top pole 40 is receded from the ABS 42 so that the leaked magnetic flux from the top pole 40 does not affect on the writing operation.

Figure 4:
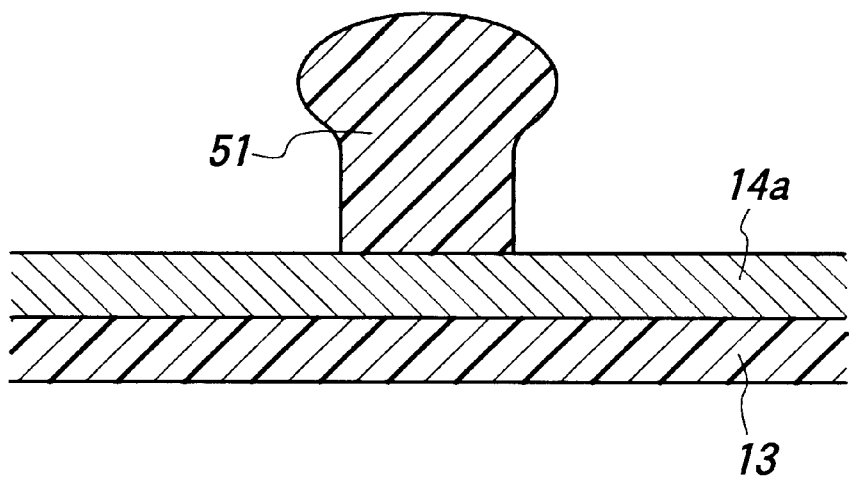
FIG. 4 is a cross sectional view showing a fabricating step for the main portion of the magnetoresistive effective type thin film magnetic head element in a fabricating method according to the present invention.
Figure 5:
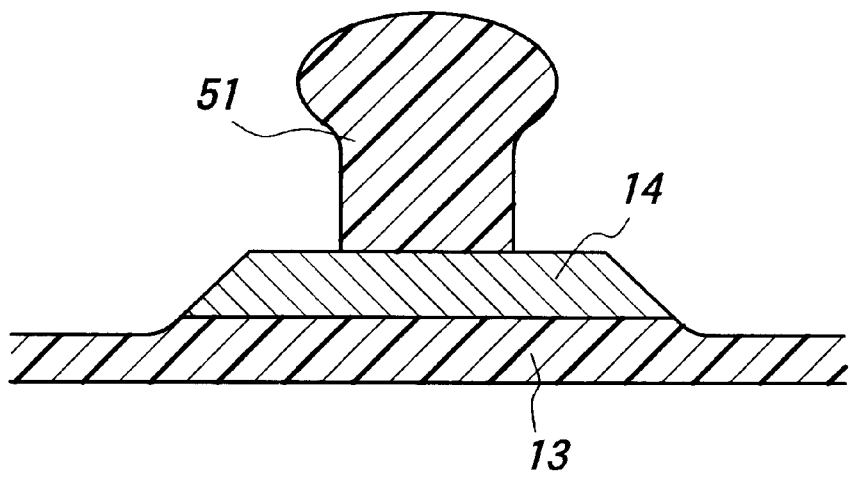
FIG. 5 is a cross sectional view showing a fabricating step after the fabricating step shown in FIG. 4.

FIGS. 4–7 are cross sectional views explaining the subsequent fabricating steps for the MR film 14, the longitudinal bias-applying films 15a and 15b, the electrode films 19a and 19b. First of all, as shown in FIG. 4, a magnetic film 14a having magnetoresistive effect is formed uniformly in a thickness of 30–40 nm on the bottom shielding gap film 13, and then, a desired first resist pattern 51 is formed on the magnetic film 14a. The resist pattern 51 has a top-enlarged cross section. Then, ion-milling process is carried out for the magnetic film 14a via the first resist pattern 51, to form the MR film 14 as shown in FIG. 5. In the ion-milling process, the bottom shielding gap film 13 may be etched. The etching depth of the film 13 will be described in detail hereinafter.

Figure 6:
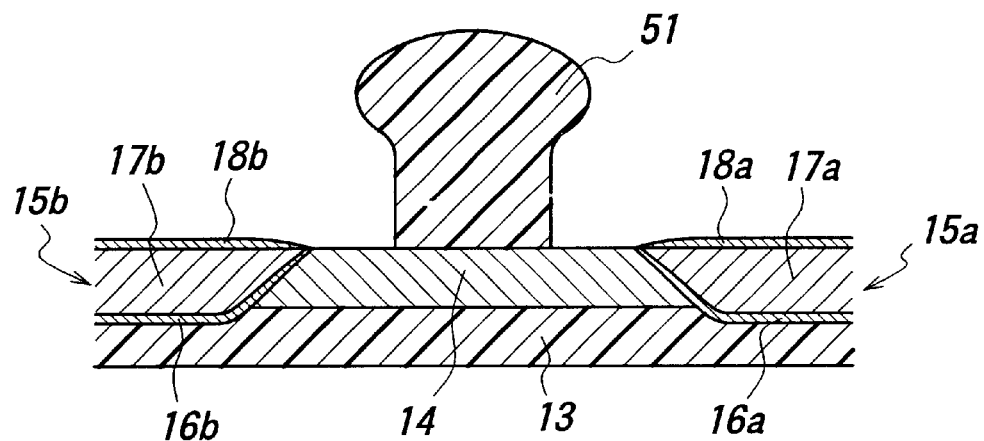
FIG. 6 is a cross sectional view showing a fabricating step after the fabricating step shown in FIG. 5.

Then, the underfilms 16a and 16b of the longitudinal bias-applying films 15a and 15b are formed in a thickness of 5–15 nm, particularly 10 nm by means of sputtering via the first resist pattern 51. Then, as shown in FIG. 6, the hard magnetic films 17a and 17b are formed in a thickness of 40–70 nm, particularly 40 nm, and the protective films 18a and 18b are formed in a thickness of 5–10 nm, particularly 5 nm. In this case, the orientations of the hard magnetic films 17a and 17b depend on the physical properties of the underfilms 16a and 16b. As a result, the total thickness of the longitudinal bias-applying films 15a and 15b are set within 50–85 nm.

Figure 7:
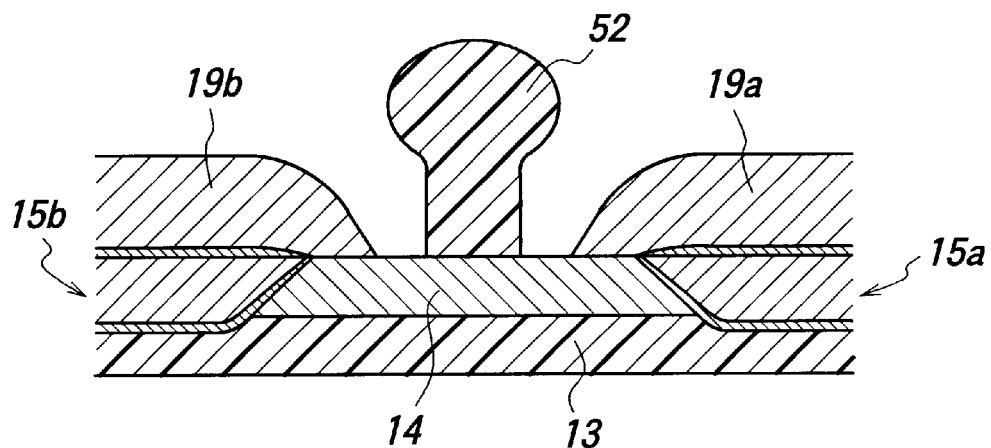
FIG. 7 is a cross sectional view showing a fabricating step after the fabricating step shown in FIG. 6.

Then, the first resist pattern 51 is removed, and thereafter, as shown in FIG. 7, a second resist pattern 52 is formed on the MR film 14. The width of the second resist pattern 52 is set smaller than the width of the first resist pattern 51. The electrode films 19a and 19b are formed by means of sputtering via the second resist pattern 52. As mentioned above, since the width of the second resist pattern 52 is set smaller than the width of the first resist pattern 51, the electrode films 19a and 19b are elongated on the edges of the top surface of the MR film 14 beyond the longitudinal bias-applying films 15a and 15b. As a result, the MR element has a lead overlay structure.

Generally, in real manufacturing process, plural thin film magnetic heads are fabricated on one wafer simultaneously. However, it is quite difficult in a conventional fabricating method to fabricate the thin film magnetic heads stably and precisely over the same wafer. The inventors found out on various and many researches and analyses that the distance W2 between the electrode films, that is, the track width is correlated with the difference in surface level between the MR film 14 and the longitudinal bias-applying films 15a and 15b, that is, the steps created therebetween.

Table 1 shows measured standard deviations $3\rho$ of track width over one wafer when the step is varied within ±30 nm at nominal track width of 0.10 $\mu$m, 0.15 $\mu$m, 0.20 $\mu$m, 0.25 $\mu$m and 0.30 $\mu$m. Herein, the second resist pattern 52 is made by utilizing a chemical multiplication type positive resist. The resist thickness is set to 0.45 $\mu$m, and the exposure degree is set within 50–60 mJ/cm$^2$. The negative sign in the step means that the surface level of the MR film 14 is higher than the surface level of the longitudinal bias-applying films 15a and 15b, and the positive sign in the step means that the surface level of the MR film 14 is lower than the surface level of the longitudinal bias-applying films 15a and 15b. The distance W1 between the longitudinal bias-applying films 15a and 15b is set larger than the track width W2 by 0.10 $\mu$m.

In table 1, the second column of "Resist formation" means the possibility of the second resist pattern 52. In "○" sign, the second resist pattern 52 can be formed. In "X" sign, the second resist pattern 52 can not be formed due to the large difference in step.

TABLE 1

| Track width ($\mu$m) | Step (nm) | Resist formation | Standard deviation over wafer $3\rho$ |
|---|---|---|---|
| 030 | −30 | ○ | 0.015 |
|  | −20 | ○ | 0.014 |
|  | −10 | ○ | 0.013 |
|  | 0 | ○ | 0.015 |
|  | +10 | ○ | 0.013 |
|  | +20 | ○ | 0.016 |
|  | +30 | ○ | 0.012 |
| 025 | −30 | ○ | 0.014 |
|  | −20 | ○ | 0.014 |

TABLE 1-continued

| Track width (μm) | Step (nm) | Resist formation | Standard deviation over wafer 3ρ |
|---|---|---|---|
| | −10 | ○ | 0.017 |
| | 0 | ○ | 0.014 |
| | +10 | ○ | 0.012 |
| | +20 | ○ | 0.015 |
| | +30 | ○ | 0.017 |
| 0.20 | −30 | ○ | 0.026 |
| | −20 | ○ | 0.016 |
| | −10 | ○ | 0.014 |
| | 0 | ○ | 0.014 |
| | +10 | ○ | 0.016 |
| | +20 | ○ | 0.017 |
| | +30 | X | 0.033 |
| 0.15 | −30 | X | 0.045 |
| | −20 | ○ | 0.018 |
| | −10 | ○ | 0.012 |
| | 0 | ○ | 0.015 |
| | +10 | ○ | 0.013 |
| | +20 | ○ | 0.014 |
| | +30 | X | 0.021 |
| 0.10 | −30 | X | 0.047 |
| | −20 | ○ | 0.017 |
| | −10 | ○ | 0.019 |
| | 0 | ○ | 0.014 |
| | +10 | ○ | 0.015 |
| | +20 | ○ | 0.018 |
| | +30 | X | 0.029 |

Figure 8:
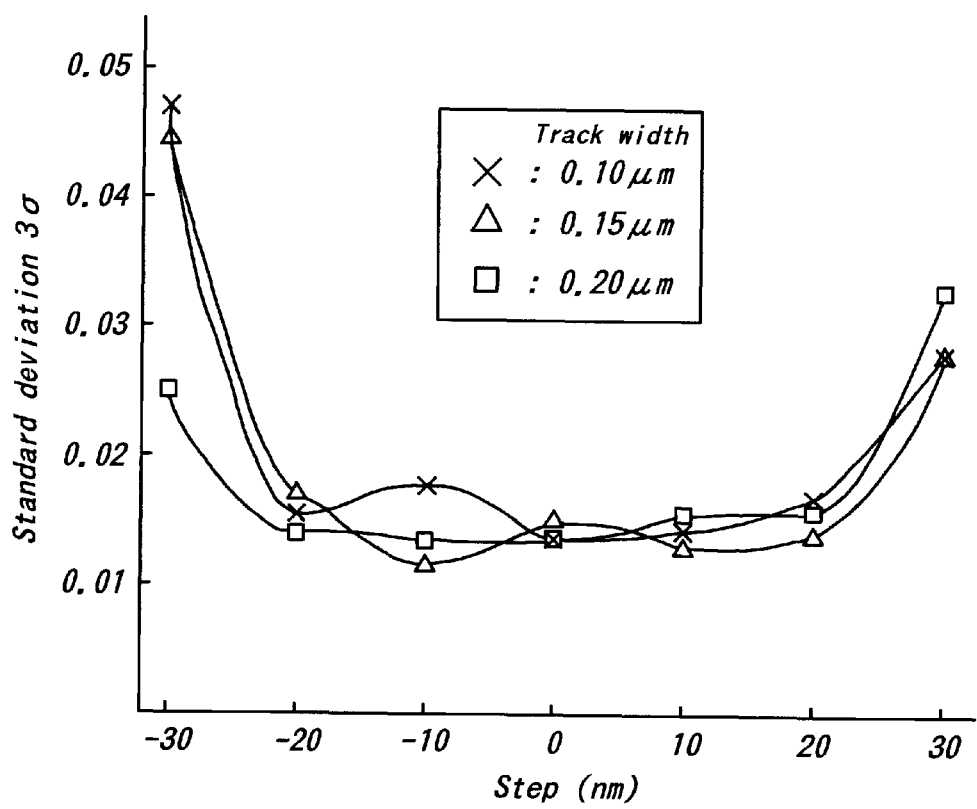
FIG. 8 is a graph showing the relation between the difference in surface level of the MR film and the longitudinal bias-applying films and the fluctuation in track width of the magnetoresistive effective type thin film magnetic head element.

FIG. 8 is a graph showing the relation between the difference in surface level of the MR film 14 and the longitudinal bias-applying films 15a; 15b and the fluctuation in track width of the magnetoresistive effective type thin film magnetic head element at nominal track width of 0.10 μm, 0.15 μm, and 0.20 μm. The abscissa axis designates the step dimension, and the vertical axis designates the standard deviation 3ρ of track width. As is apparent from FIG. 8, for reducing the standard deviation below a given lower level within ±0.020, that is, uniforming the track widths of thin film magnetic heads over the same wafer, it is required that the step, that is, the difference in surface level between the MR film 14 and the longitudinal bias-applying films 15a; 15b is set within ±20 nm.

As mentioned above, it is requires in the present invention that the difference in surface level between the MR film 14 and the longitudinal bias-applying films 15a; 15b is set within ±20 nm before the electrode films 19a and 19b are formed. In this case, the above ranged difference in surface level can be realized by controlling the thicknesses of the underfilms 16a; 16b and the protective films 18a; 18b, and the etching thickness of the bottom shielding gap film 13 in the thickness direction. The reason is that the thickness of the hard magnetic films 17a and 17b is fixed on the design specification and can not be changed. If the thickness of the hard magnetic film is changed, the performance of the thus obtained thin film magnetic head becomes different from the designed one. These controlling means may be preferably combined.

Although the present invention was described in detail with reference to the above examples, this invention is not limited to the above disclosure and every kind of variation and modification may be made without departing from the scope of the present invention. In the above embodiment, the normal type of combination type thin film magnetic head is fabricated, but a reversed type of combination type thin film magnetic head may be fabricated. In this case, an inductive type thin film magnetic head element and a magnetoresistive effective type thin film magnetic head element are fabricated on a given substrate in turn. Moreover, the present invention may be applied for any type of thin film magnetic head as well as the combination type thin film magnetic head.

What is claimed is:

1. A thin film magnetic head including a magnetoresistive effective type thin film magnetic head element comprising:

a first and a second magnetic shielding films which are made of magnetic material, a first and a second shielding gap films which are made of non-magnetic insulating material and located between said first and said second magnetic shielding films, a magnetoresistive effective element film which is located between first and second, longitudinal bias-applying films which are located in both sides of said magnetoresistive effective element film and composed of an underfilm, a protective film and a hard magnetic film sandwiched between said underfilm and said protective film, and a first and a second electrode films which are located so as to cover edge portions of said magnetoresistive effective element film beyond said first and said second longitudinal bias-applying films, wherein the difference in surface level between said magnetoresistive effective element film and said first and said second longitudinal bias-applying films is set within ±20 nm.

2. A thin film magnetic head as defined in claim 1, having a track width of 0.2 μm or below which is defined by the distance between said first and said second electrode films.

3. A thin film magnetic head as defined in claim 1, further including an inductive type thin film magnetic head element on or under said magnetoresistive effective type thin film magnetic head element, to constitute a combination type thin film magnetic head.

4. A thin film magnetic head as defined in claim 1, wherein said first shielding gap film has depressed portions on the top surface thereof, and said first and said second longitudinal bias-applying films are formed on said depressed portions of said first shielding gap film.

* * * * *